(12) United States Patent
Stramel et al.

(10) Patent No.: US 6,503,308 B2
(45) Date of Patent: Jan. 7, 2003

(54) BLACK INK COMPOSITIONS FOR INKJET PRINTING

(75) Inventors: Rodney D. Stramel, San Diego, CA (US); Kai Kong Iu, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/742,475

(22) Filed: Dec. 20, 2000

(65) Prior Publication Data

US 2002/0121219 A1 Sep. 5, 2002

(51) Int. Cl.[7] ............................................. C09D 11/00
(52) U.S. Cl. ................. 106/31.27; 106/31.5; 106/31.52
(58) Field of Search ........................... 106/31.27, 31.5, 106/31.52

(56) References Cited

U.S. PATENT DOCUMENTS

| | | | |
|---|---|---|---|
| 4,694,302 A | 9/1987 | Hackleman et al. | 346/1.1 |
| 5,062,892 A | 11/1991 | Halko | 106/22 |
| 5,421,871 A * | 6/1995 | Onishi et al. | 106/31.49 |
| 5,580,372 A | 12/1996 | Gino et al. | 106/20 R |
| 5,725,641 A | 3/1998 | MacLeod | 106/31.5 |
| 5,851,273 A | 12/1998 | Morris et al. | 106/31.27 |

* cited by examiner

*Primary Examiner*—Helene Klemanski
*Assistant Examiner*—Veronica F. Faison (57) ABSTRACT

The present invention provides black ink compositions for use in inkjet printing, which exhibit improved neutral color, light fastness, and gray scale properties. The black ink compositions generally include a mixture of two or more black dyes in balanced concentrations to obtain black ink having the improved properties while retaining good printability in an inkjet pen. In one aspect, a black ink composition may include a mixture of pacified Reactive Black 31 and Direct Black 168.

20 Claims, 3 Drawing Sheets

0%  Percent Area Fill  100%

BLACK INK COMPOSITIONS FOR INKJET PRINTING

FIELD OF THE INVENTION

The present invention relates generally to black ink compositions for use in ink jet printers. More particularly, the present invention relates to black ink compositions having improved properties such as neutral color, light fastness, optical density, and gray scaling.

BACKGROUND OF THE INVENTION

An ink jet image is formed when a precise pattern of dots is ejected from a drop generating device known as a "print head" onto a printing medium. The typical ink jet print head has an array of precisely formed nozzles located on a nozzle plate and attached to an ink jet print head substrate. The substrate incorporates an array of firing chambers that receive liquid ink (colorants dissolved or disbursed in a solvent) through fluid communication with one or more ink reservoirs. Each chamber has a thin film resistor, known as "firing resistor", located opposite the nozzle so ink can collect between the firing resistor and the nozzle. In particular, each resistor element, which is typically a pad of a resistive material, measures about 35 um×35 um. The print head is held and protected by an outer packaging referred to as a print cartridge, i.e., ink jet pen.

Upon energizing of a particular resistor element, a droplet of ink is expelled through the nozzle toward the print medium. The firing of ink droplets is typically under the control of a microprocessor, which conveys signals through electrical traces to the resistor elements. Thus the formation of alpha numeric and other characters on the print medium is possible.

The tight tolerances of the nozzles, typically 30 to 40 um diameter require that the ink not clog the nozzles. Further, repeating firings of the resistor elements, which must withstand many millions of firings over the life of the ink cartridge to be commercially practical, can result in fouling of the resistor elements and degradation of pen performance. This buildup of residue on the resistor element is unique to ink jet printers and is known as kogation.

The ink composition must be capable of interacting with the print medium in a manner sufficient to penetrate the print medium without undo spreading and a subsequent decrease in print quality. Furthermore, in order to maintain the integrity of the printed image over time, it is important that the colorant be light fast and not degrade with exposure to light over time.

In general, the light fastness of ink jet images still falls short of that produced by other technologies, such as electrophotography or gravure printing. Therefore, a continued demand in ink jet printing has resulted in the need to develop reliable printers capable of producing high quality light fast images at a reasonable cost.

Other properties that are required for black ink jet ink compositions, to effectively compete with other imaging technology include neutral black color, neutral gray scale, and good optical density. Good optical density, or fullness and intensity of color, is required in order to produce images, which are full in tone and not washed out. Further, as optical density range increases, so does the ability to produce sharp transitions between different shades of black. The shades of black, ranging from black to white, are known as gray scale. Generally speaking, black inks that display a higher optical density are capable of producing a greater number of transitory gray shades between black and white, and therefore produce higher quality images. Moreover, a large gray scale having a wide range of gray shades with crisp shade transition capacity is needed when producing complex images, such as photographs, in order to achieve the same quality of other imaging techniques.

In addition to good optical density and gray scaling properties, the production of high quality complex images requires that the black color be as neutral as possible. Because the color black is a combination of many colors, often, the black will have a colored hue. Hues of red, green, yellow, and blue are the most common, and may be due to a variety of factors, including the amount or concentration of each color. Black ink with no hue would be considered neutral, however, because of the human eye's inability to detect very slight hues, black ink may still have a certain amount of hue and appear neutral.

One method for attempting to achieve a neutral black color is an inefficient process known as under printing. When black ink with a known hue is used for printing, other colors that have been selected to neutralize the colored hue in the black ink may be first printed on a print medium. The black ink is then printed over these colors. For example, when black ink with a blue hue is used, magenta or yellow inks, are applied to the print medium in a first pass of the ink jet nozzle, and then the black ink applied over the top of the magenta or yellow inks in a second pass of the inkjet nozzle.

The neutrality of the black ink affects the quality of gray scale. Particularly, when black ink with a significant hue is used, the visibility of the hue color becomes increasingly apparent with each lighter shade of black in the transition from black to white. Therefore, complex images requiring a large gray scale will be of poor quality when produced by black ink with a significant hue and appear as brown, tan, or another intermediate color. Further, the sharpness and detail of the image may be compromised.

Accordingly, investigations continue into developing ink formulations which have improved properties and which do not improve one property at the expense of the others. Thus, the challenge remains to further improve the light fastness, optical density, color neutrality, gray scale quality, and pen performance of black ink jet inks.

SUMMARY OF THE INVENTION

It has been recognized that inkjet ink, which has an improved light fastness and optical density is highly desirable. It has further been recognized that inkjet ink, which has an improved neutral color, or hue, and an improved gray scale is highly desirable. It has been also recognized that inkjet ink, which possesses the above-recited improvements while maintaining or improving printability performance is very desirable.

Accordingly, the present invention provides a black ink composition for inkjet printing which includes a mixture of pacified Reactive Black (pRB) 31 and Direct Black (DB) 168 dyes, in an inkjet ink vehicle. Additionally, the present invention provides a black ink composition for inkjet printing which consists essentially of a mixture of pRB 31 and DB 168 dyes in an inkjet ink vehicle. In one aspect, the dyes may be present in a salt form. In another aspect, the salt form of the dyes may be a salt form selected from the group consisting of: sodium salts, lithium salts, TMA salts, potassium salts, and mixtures thereof.

In one aspect of the invention, the pRB 31 may be a hydroxyl form. In another aspect of the invention, the pRB 31 may be a vinyl form. In yet another aspect, the pRB 31 may be a mixture of hydroxyl and vinyl forms.

In one aspect of the invention, the dyes may be present in a ratio of from about 1:10 to about 10:1. In another aspect, the dyes may be present in a ratio of about 1:4 to about 4:1. In yet another aspect, the dyes may be present in a ration of about 1:1. In a further aspect, the dyes may be cumulatively present in an amount of from about 1 to about 10 percent by weight of the ink composition. In yet another aspect of the invention, the dyes may be cumulatively present in an amount of from about 3.5 to about 4.5 percent by weight of the ink composition.

In addition to the inkjet ink composition recited above, the present invention encompasses a method for making black inkjet ink. In one aspect, such a method may include the step of combining a pacified reactive black 31 dye with a direct black 168 dye in an inkjet ink vehicle.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION

Before the present inkjet ink composition and method of making are disclosed and described, it is to be understood that this invention is not limited to the particular process steps and materials disclosed herein, but is extended to equivalents thereof as would be recognized by those ordinarily skilled in the relevant arts. It should also be understood that terminology employed herein is used for the purpose of describing particular embodiments only and is not intended to be limiting.

A. Definitions

In describing and claiming the present invention, the following terminology will be used.

The singular forms "a," "an," and, "the" include plural referents unless the context clearly dictates otherwise. Thus, for example, reference to "a dye" includes reference to one or more of such dyes, reference to "an ink" includes reference to one or more of such inks, and reference to "the color" includes reference to a mixture of one or more of such colors.

As used herein, "effective amount" refers to the minimal amount of a substance or agent, which is sufficient to achieve a desire effect. For example, an effective amount of an "ink vehicle" is the minimum amount required in order to create ink, which will meet the specified performance and characteristic standards. Additionally, the minimum amount of a "dye" would be the minimum amount, which can still achieve the specified performance and characteristic standards.

As used herein, "ink vehicle," refers to the vehicle in which a dye is placed to form ink. Ink vehicles are well known in the art, and a wide variety of ink vehicles may be used with the ink composition of the present invention. Such ink vehicles may include a mixture of a variety of different agents, including without limitation, surfactants, solvents, co-solvents, buffers, biocides, viscosity modifiers, surface-active agents, and water.

As used herein, "pacified reactive black," or "pRB" may be used interchangeably, and refer to a black dye having the following general formula:

wherein X is $CH_2CH_2OH$, or $CH_2-CH_2=CH_2$, or a mixture thereof, and wherein Me represents $CH_3$. When X is $CH_2CH_2OH$, the pRB is known as the "ethyl hydroxy form," or "hydroxyl form," which may be used interchangeably. When X is $CH_2-CH_2=CH_2$, the pRB is known as the "vinyl sulfone form," or "vinyl form" which may be used interchangeably. Additionally, salt and other derivative forms, such as sodium salts, lithium salts, trimethylamine (TMA) salts, potassium salts, and the like may be used.

As used herein, "direct black 168," or "DB 168" refers to a dye having the following general formula:

Additionally, salt and other derivative forms, such as sodium salts, lithium salts, TMA salts, potassium salts, and the like may be used.

Concentrations, amounts, solubilities, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a concentration range of 1% w/w to 10% w/w should be interpreted to include not only the explicitly recited concentration limits of 1% and 10%, but also to include individual concentrations within that range, as well as sub ranges such as 2% w/w, 3.5%–4.5% w/w, 4.1% w/w, 5% w/w, 8% w/w, etc. This interpretation should apply regardless of the breadth of the range or the characteristic being described.

B. The Invention

The present invention encompasses a black ink composition for use in an inkjet printer. In one aspect, the black ink composition may include a mixture of pacified reactive black (pRB) 31 and direct black (DB) 168 dyes, in an inkjet ink vehicle. The salt form of each dye, such as sodium salts, lithium salts, TMA salts, potassium salts, etc., and mixtures thereof may be used. Additionally, the pRB 31 may be used in a hydroxyl form, a vinyl form, or in a mixture of these two forms.

Generally, pRB 31 is produced by pacification of Reactive Black 31 (RB 31) dye (available as Remazol Black R-KRL from Hoescht Chemical Company) employing well-known pacification methods. One of such processes is disclosed in U.S. Pat. No. 5,725,641, which is incorporated by reference in its entirety. Other methods or variations of the pacification process are known to those skilled in the art, and the production of pRB 31 for use in the present invention is not limited to any particular process.

Direct Black 168 (DB 168) is a well-known water-soluble tri-azo dye, which is used for dying various fibers, including paper. Various methods for producing DB 168 are well known to those of ordinary skill in the art. DB 168 is available as C.I. Direct Black-168 from Zeneca Corp., under the trade name PROJET FAST BLACK 2®, and various forms and derivatives thereof are disclosed in U.S. Pat. Nos. 4,767,459, 5,026,425, and 5,580,372 which are incorporated by reference in their entirety.

The ratio of pRB 31 to DB 168 in the ink composition of the present invention may vary greatly. In one aspect, the ratio may be from about 1:10 to about 10:1. In another aspect, the ratio may be from about 1:4 to about 4:1. In yet another aspect, the ratio may be from about 1:3 to about 3:1. In a further aspect, the ratio may be about 1:1.

In addition to wide variation in the ratio of pRB 31 to DB 168, the cumulative amount of the dyes in the present ink composition may vary. In one aspect, the dyes may be present in a cumulative amount of from about 1 to about 10 percent by weight of the ink composition. In another aspect, the dyes may be cumulatively present in an amount of from about 2 to about 8 percent by weight of the ink composition. In yet another aspect, the dyes may be cumulatively present in an amount of from about 3.5 to about 4.5 percent by weight of the ink composition. In a further aspect, the dyes may be cumulatively present in an amount of about 4.1 percent by weight of the ink composition.

One of ordinary skill in the art will recognize that other dyes may be included in the ink composition of the present invention in order to achieve a specifically desired result, such as certain hues, etc. Such results may be desirable based upon geographic location where the accepted standard black color has a certain hue. For example, black inks with a slightly blue hue may be perceived as "normal black" in the United States, while black inks with a slightly yellow hue may be perceived as normal in Asia. However, in one aspect of the present invention, the ink composition may consist essentially of a mixture of pRB 31 and DB 168 dyes, in an inkjet ink vehicle. Further, the above-recited parameters as to amount, type, and ratio may be applied in such a formulation.

Many well-known ink vehicles may be used in combination with the combination of dyes disclosed herein to produce the ink composition of the present invention. A variety of ingredients in varying amounts may be included in the ink vehicle of the present composition, such as water, organic solvents, surface-active agents, buffers, viscosity modifiers, biocides, surfactants, and metal chelators.

Water may make up a large percentage of the overall ink vehicle of the present invention. In one aspect, the water may be deionized water in an amount of from about 51 to 90 percent by weight of the ink composition. Various deionization techniques and states for water are known. In one aspect, the water may be deionized at 18 Mohm.

The organic solvent, or co-solvent component of the present ink vehicle is generally a water-soluble solvent, and may be present in an amount of from about 10 to about 49 percent by weight. In a further aspect, the organic solvent may be present in an amount of about 17 percent by weight of the ink composition.

One or more solvents may be used to achieve the amount specified above. Further, when a mixture of solvents is used, the combination may be included in a variety of ratios when necessary to achieve a specific result.

Examples of suitable solvents include without limitation: nitrogen-containing heterocyclic ketones, such as 2-pyrrolidone, N-methyl-pyrrolid-2-one (NMP), 1,3-dimethylimidazolid-2-one, and octyl-pyrrolidone; diols such as ethanediols, (e.g., 1-2-ethandiol), propanediols (e.g., 1,2-propanediol, 1,3-propanediol, 2-ethyl-2-hydroxy-methyl-1, 3-propanediol, ethylhydroxy-propanediol (EHPD)), butanediols (e.g., 1,2-butanediol, 1,3-butanediol, 1,4-butanediol), pentanediols (e.g., 1,5-pentanediol), hexanediols (e.g., 1,6-hexanediol, 2,5-hexanediol), heptanediols (e.g., 1,2-heptanediol, 1,7-heptanediol), octanediols (e.g., 1,2- octanediol, 1,8-octainediol) ; and glycols, glycol ethers and thioglycol ethers, commonly employed in ink-jet inks, such as polyalkylene glycols such as polyethylene glycols (e.g., diethylene glycol (DEC), triethylene glycol, tetraethylene glycol), polypropylene glycols (e.g., dipropylene glycol, tripropylene glycol, tetrapropylene glycol), polymeric glycols (e.g., PEG 200, PEG 300, PEG 400, PPG 400), and thiodiglycol.

Further, mixtures of one or more of such solvents may be used. In one aspect, the solvents included in the composition of the present invention may be a mixture of 2-pyrrolidone, and EHPD. In another aspect, the 2-pyrrolidone, and the EHPD may be present at about a 1:3 ratio.

When included, the surfactant ingredient may be added in an amount of up to about 5 percent by weight of the ink composition. In one aspect, the surfactant may be present in an amount of from about 0.01 to about 4%. In yet another aspect, the surfactant may be present in an amount of about 2.25 percent by weight of the ink composition. Such amounts may be achieved using a single surfactant ingredient, or a mixture of surfactant ingredients as indicated below.

Generally, surfactants are used in order to increase the penetration of the ink into the print medium. A wide variety of surfactant classes may be used including without limitation, cationic, anionic, zwitterionic or non-ionic surfactants. One example of nonionic surfactants is secondary alcohol ethoxylates. Such compounds are commercially available, for example, from Union Carbide Co. (Houston, Tex.) and other producers as the Tergitol, Surfynol, and Dowfax series, such as TERGITOL 15-S-5, TERGITOL 15-S-7, SURFYNOL 104E, SURFYNOL 440, and DOWFAX 8390.

The secondary alcohol ethoxylates contain (a) an aliphatic chain having a prescribed number of carbon atoms in the chain, and (b) a prescribed number of ethoxylated units. These ethoxylates are commercially available as mixtures of ethoxylates, and so are described in terms of the predominance of a given compound. Examples of other classes of surfactants those skilled in the art will readily recognize specific examples of the other classes of surfactants recited above, as well as any other suitable surfactants for use with the present invention.

The ink vehicle of the present ink composition may optionally include up to about 5 percent by weight of a biocide. In one aspect, the biocide may be present in an amount of up to about 1 percent by weight of the ink composition. In a further aspect, the biocide may be present in an amount of up to 0.2 percent by weight of the ink composition. Such amounts may be the result of a single biocide ingredient, or a mixture of two or more biocides.

Any of the biocides commonly employed in ink-jet inks, and known to those skilled in the art may be used in the practice of the present invention, such as NUOSEPT 95, available from Hals America (Piscataway, N.J.); PROXEL GXL, available from Zeneca (Wilmington, Del.); and glutaraldehyde, available from Union Carbide Company (Bound Brook, N.J.) under the trade designation UCARCIDE 250. In one aspect, the biocide is PROXEL GXL.

In addition to the above-recited ingredients, the present inkjet ink composition may include a buffer agent. In one aspect, the buffer agent may be present in an amount of up to about 5 percent by weight of the ink composition. In another aspect, the buffer may be present in an amount of up to about 1 percent by weight of the ink composition. In yet another aspect, the buffer may be present in an amount of about 0.25 percent by weight of the ink composition. These amounts may be achieved using a single buffer agent, or a combination of buffer agents.

The buffers in the ink vehicle of the present composition are primarily used to modulate pH. Such buffers can be organic-based biological buffers, or inorganic buffers such as sodium phosphate. Furthermore, the buffers employed should impart a pH range of from about 6 to about 9 to the present ink composition. In one aspect, the pH may be from about 6.5 to about 8. In another aspect, the pH range may be from about 6.7 to about 7.1. Examples of acceptable organic buffers include without limitation, Trizma Base, available from companies such as Aldrich Chemical (Milwaukee, Wis.), 4-morpholineethanesulfonic acid (MES), and 4-morpholinepropane sulfonic acid (MOPS). In one aspect, the buffer may be MOPS.

Metal chelator agents may be optionally included in the ink vehicle of the present ink composition. In one aspect, the metal chelator may be present in an amount of up to about 2 percent by weight. In another aspect, the metal chelator may be present in an amount of up to about 1 percent by weight of the ink composition. In a further aspect, the metal chelator may be present in an amount of up to about 0.5 percent of the ink composition. In yet another aspect, the metal chelator may be present in an amount of about 0.1 percent by weight of the ink composition. One or more metal chelators may be used to achieve these amounts.

Metal chelators employed in the practice of the invention are used to bind transition metal cations that may be present in the ink. A variety of metal chelators may be used in connection with the present invention as will be recognized by those skilled in the art. Examples of suitable metal chelators include without limitation, Ethylenediaminetetra acetic acid (EDTA), Diethylenetriaminepentaacetic acid (DTPA), trans-1,2-diaminocyclohexanetetraacetic acid (CDTA), (ethylenedioxy) diethylenedinitrilotetraacetic acid (EGTA), and other chelators that bind transition metal cations. In one aspect, the metal chelator is EDTA.

In addition to the disclosed black ink composition, the present invention encompasses a method of making a black ink composition for inkjet printing. In one aspect, such a method includes combining a pRB 31 dye with a DB 168 dye in an inkjet ink vehicle. The dyes may be combined in any of the amounts and ratios specified herein. Further, the inkjet ink vehicle may be made in accordance with the components and amounts disclosed herein.

C. EXAMPLES

The following examples of black ink compositions are provided to promote a more clear understanding of the possible combinations of the present invention, and are in no way meant as a limitation thereon.

The black ink compositions of Examples 1–4 below were prepared by mixing the specified ingredients in accordance with customary techniques known to those skilled in the art.

Example 1 (8600)

| Cosolvent | Amount (% w/w) |
| --- | --- |
| Water | 73.93 |
| 2-Pyrrolidone | 4.84 |
| Surfynol 104E | 0.05 |
| EHPD | 12 |
| Dowfax 8390 | 1 |
| MOPS | 0.025 |

-continued

| Cosolvent | Amount (% w/w) |
|---|---|
| Proxel GXL | 0.2 |
| EDTA sodium salt | 0.1 |
| Surfynol 440 | 0.75 |
| Dyes | |
| pRB31 Na | 0 |
| DB168 Na | 4.10 |
| Total: | 100 |

Dyes: pRB31 Na 1/10K Abs. = 0.0; DB168 Na 1/10K Abs. = 0.173

Example 2 (8620)

| Cosolvent | Amount (% w/w) |
|---|---|
| Water | 73.93 |
| 2-Pyrrolidone | 4.84 |
| Surfynol 104E | 0.05 |
| EHPD | 12 |
| Dowfax 8390 | 1 |
| MOPS | 0.025 |
| Proxel GXL | 0.2 |
| EDTA sodium salt | 0.1 |
| Surfynol 440 | 0.75 |
| Dyes | |
| pRB31 Na | 0.82 |
| DB168 Na | 3.27 |
| Total: | 100 |

Dyes: pRB31 Na 1/10K Abs. = 0.035; DB168 Na 1/10K Abs. = 0.138

Example 3 (8640)

| Cosolvent | Amount (% w/w) |
|---|---|
| Water | 73.93 |
| 2-Pyrrolidone | 4.84 |
| Surfynol 104E | 0.05 |
| EHPD | 12 |
| Dowfax 8390 | 1 |
| MOPS | 0.025 |
| Proxel GXL | 0.2 |
| EDTA sodium salt | 0.1 |
| Surfynol 440 | 0.75 |
| Dyes | |
| pRB31 Na | 1.61 |
| DB168 Na | 2.46 |
| Total: | 100 |

Dyes: pRB31 Na 1/10K Abs. = 0.069; DB168 Na 1/10K Abs. = 0.104

Example 4 (8650)

| Cosolvent | Amount (% w/w) |
|---|---|
| Water | 73.93 |
| 2-Pyrrolidone | 4.84 |
| Surfynol 104E | 0.05 |
| EHPD | 12 |
| Dowfax 8390 | 1 |
| MOPS | 0.025 |

-continued

| Cosolvent | Amount (% w/w) |
|---|---|
| Proxel GXL | 0.2 |
| EDTA sodium salt | 0.1 |
| Surfynol 440 | 0.75 |
| Dyes | |
| pRB31 Na | 2.02 |
| DB168 Na | 2.05 |
| Total: | 100 Ink Example 8650 |

Dyes: pRB31 Na 1/10K Abs. = 0.0866; DB168 Na 1/10K Abs. = 0.0866

After preparation, the ink compositions were submitted to both color and inkjet performance testing. The purpose for performance testing is to determine whether an ink composition is suitable for use in an inkjet printer. Performance testing is conducted using industry standard tests to measure performance factors such as ink velocity and print quality.

The performance tests conducted were based on a drop velocity test between inkjet nozzles, which had not been fired, and nozzles, which had fired 60 million drops. A velocity difference of less than or equal to 0.5 meters per second is desirable. Other criteria for evaluating ink composition performance include a visual inspection and comparison of the printed product produced by the stressed nozzle to the product produced by the unstressed nozzle.

The results of Table 1 show the performance of the composition of Example 4 as compared to other known black ink formulations.

TABLE 1

Comparative and Examples Black Inks in Thermal Inkjet Pens

| Ink | Dye | Unstressed - Stressed Velocity | Print Quality |
|---|---|---|---|
| Z4 | Source 1 PRB-31 | 0.1 m/s | No Difference |
| Z100 | Source 1 DB168 | 4.5 m/s | No Difference |
| Z110 | Source 1 DB19 | 2.0 m/s | Very Streaky |
| Z120 | Source 1 286/287 | 0.1 m/s | Stressed Nozzles Visible |
| Z250 | Source 2 DB168 | 3.2 m/s | Streaky |
| Z260 | Source 2 FB2Li | 1.1 m/s | Stressed Nozzles Visible |
| Z290 | Source 2 DB19 | 1.5 m/s | No Difference |
| Z330 | Source 3 DB168 | 3.3 m/s | Stressed Nozzles Visible |
| CZ109 | DB168 + PRB31 | 0.5 m/s | No Difference |

As can be seen, the ink composition containing the mixture of pRB 31 and DB 168 achieved the desired result in both the velocity and print quality tests.

Figure 1:
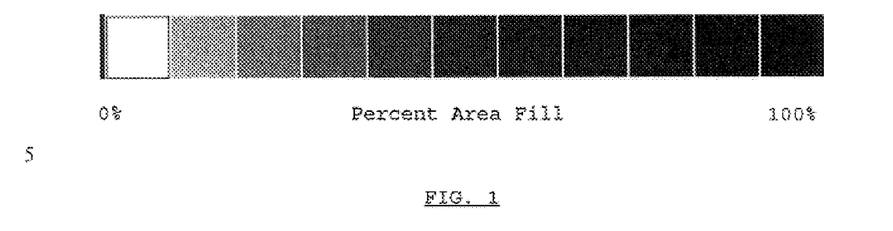
FIG. 1 is a reproduction of a standard optical density scale for black ink from 0% to 100% area fill.

Color neutrality testing of various ink compositions was carried out using a Minolta CM-503C spectrophotometer to determine L*a*b* values for each composition in accordance with standard CIE (Comission Internationale de l'Eclairage) standards as known in the art. FIG. 1 shows the standard scale for L* values, or optical density, using a percent area fill from 0% (print media color) to 100%.

Figure 2:
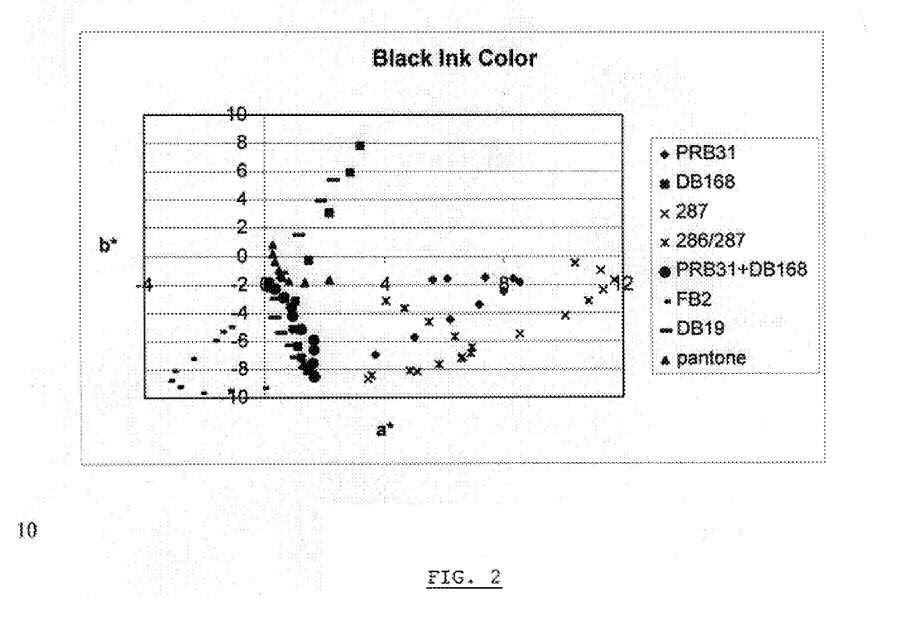
FIG. 2 is a graphical representation of the CIE L*a*b* color space results for ink densities from 0% to 100% area fill, projecting the hue onto an a*, b* plane for one ink composition in accordance with the present invention, as compared to other known ink formulations.

The results of the color neutrality testing are shown in FIG. 2. The origin 0,0 of the graph in FIG. 2 represents an absolutely neutral black color. In other words, the origin represents a black color having absolutely no other color hue. The a* axis represents the amount of blue and yellow hues in the black color. Positive values indicate increasing yellow hues, and negative values indicate increasing blue hues. The b* axis represents the amount of red and green hues in the black color. Positive values indicate increasing red hues, and negative values indicate increasing green hues. The L* axis (not shown) measures the optical density as discussed earlier. The L* axis is a Z axis and therefore adds a third dimension which comes out of FIG. 2. The media color, or 0% optical density on the L* axis is indicated where the symbols for each ink composition are clustered, and optical density increases toward 100% with each symbol mark moving away from the cluster for each respective ink composition.

Even though the origin 0,0 represents absolutely neutral black, the human eye is incapable of detecting slight differences in hue. Particularly, the human eye may detect hue increases from 0,0 in increments of about 2 on the present scale. Therefore, ink compositions, which are most tightly clustered around the origin, show superior color neutrality. Further, those ink compositions, which are most tightly clustered from the 0% area fill mark through the 100% mark show superior gray scaling results.

Referring again to FIG. 2, the composition in accordance with the present invention, PRB 31+DB168, which is indicated by a filled circle symbol (•), shows both superior color neutrality and gray scaling to all other inks tested. Pantone®, indicated by the triangles (▲) represents the results achieved for samples of Pantone® Inc's color system, which is an industry wide standard color system, and well recognized by those skilled in the art. Further, superior results are surprisingly shown by the combination of pRB 31 and DB 168, as compared to the ink compositions containing these dyes individually. A filled diamond symbol (♦) represents PRB 31, and a filled square symbol (■) represents DB 168. As can be seen, the color hue of the pRB 31 passes through several hue color changes, which are detectable to the human eye as its optical density increases, and creates a hook pattern on the graph. Further, the DB 168 also passes through several hue color changes that are detectable to the human eye as the its optical density increases. As such, each of these ink formulations presents a less desirable gray scale.

Figure 3:
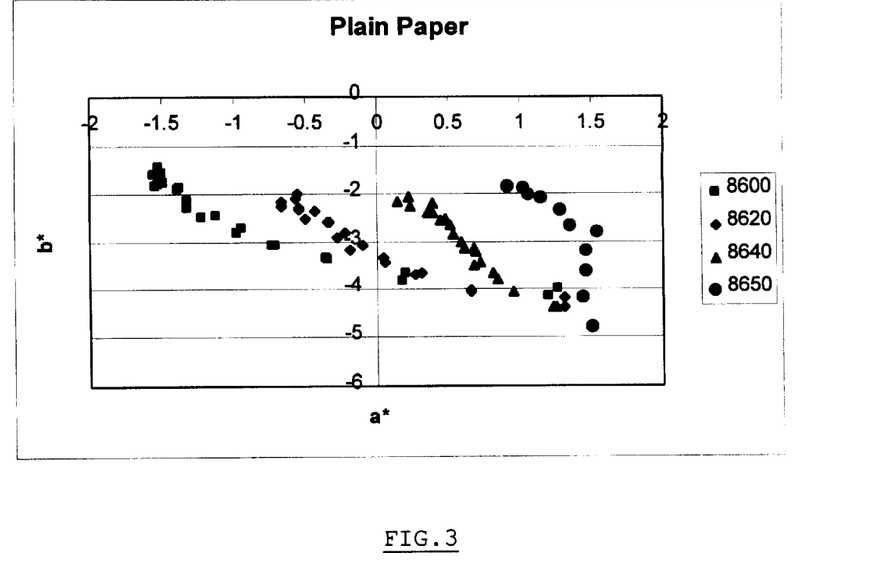
FIG. 3 is a graphical representation of the CIE L*a*b* color space results for ink densities from 0% to 100% area fill, projecting the hue onto an a*, b* plane for a control ink and various ink formulations in accordance with the present invention on a plain paper medium.
Figure 4:
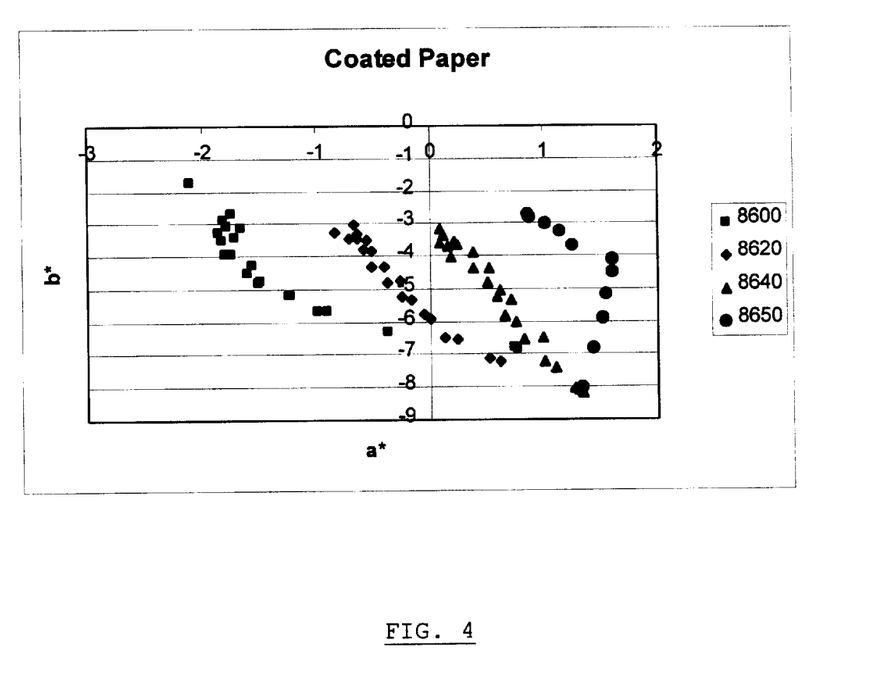
FIG. 4 is a graphical representation of the CIE L*a*b* color space results for ink densities from 0% to 100% area fill, projecting the hue onto an a*, b* plane for a control ink and various ink formulations in accordance with the present invention on a coated paper medium, such as HP product C6955A.
Figure 5:
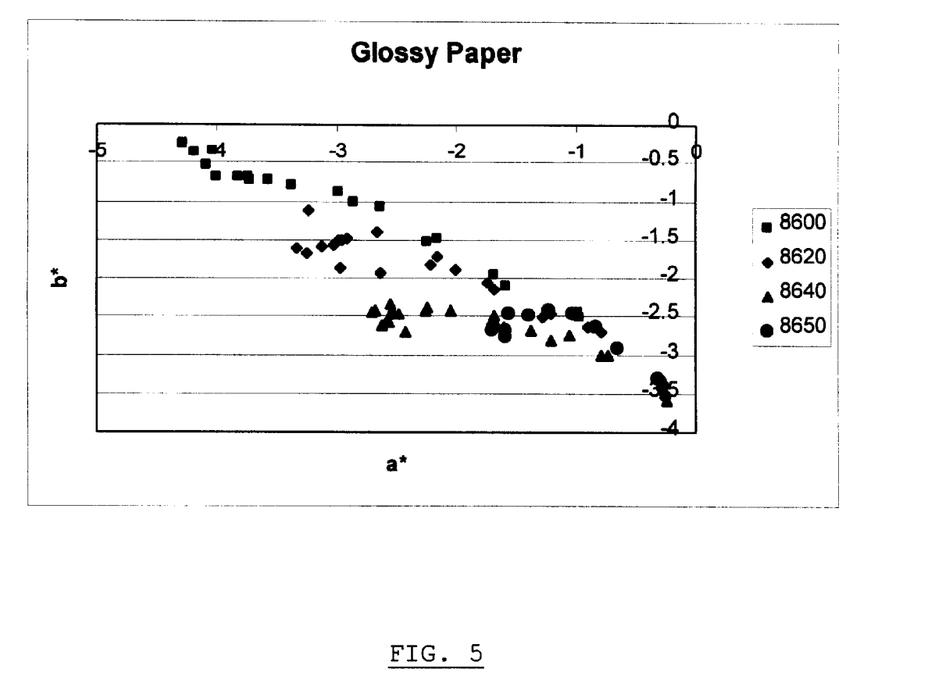
FIG. 5 is a graphical representation of the CIE L*a*b* color space results for ink densities from 0% to 100% area fill, projecting the hue onto an a*, b* plane for a control ink and various ink formulations in accordance with the present invention on a glossy paper medium, such as HP product C6039A.

Referring now to FIGS. 3–5 are shown the color testing results across various print media of the ink compositions of Examples 1–4, as compared to an ink containing only pRB 31. Particularly, FIG. 3 used a plain paper medium, FIG. 4 used a coated paper medium, and FIG. 5 used a glossy paper medium. As can be seen, each of the inks from Examples 1–4 achieved black colors with acceptable neutrality, and further displayed superior gray scaling to the pRB 31 only ink.

Of particular note is the excellent gray scaling results achieved by the ink of Example 4 on the glossy paper medium in FIG. 5. The ink of Example 4 is represented by the circle marks (•). As can be seen, the tight cluster of marks shows that the color hue changes from 0% optical density to 100% optical density are imperceptible to the human eye. As such, no color changes through the gray scale are perceptible, and this particular ink composition may be used with glossy media, such as photograph paper in order to produce excellent complex images, which require a great amount of gray scaling.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A black ink composition for inkjet printing comprising:
   a mixture of pacified reactive black (pRB) 31 and direct black (DB) 168 dyes, in an inkjet ink vehicle that when printed on a print medium, produces a gray scale of from 0% to 100% area fill without a visually perceptible change in either a blue, yellow, red, or green color hue.

2. A black ink composition as set forth in claim 1, wherein the dyes are present in a salt form.

3. A black ink composition as set forth in claim 2, wherein the salt form of the dyes is a salt form selected from the group consisting of: sodium salts, lithium salts, TMA salts, potassium salts, and mixtures thereof.

4. A black ink composition as set forth in claim 1, wherein the pRB 31 is a hydroxyl form.

5. A black ink composition as set forth in claim 1, wherein the pRB 31 is a vinyl form.

6. A black ink composition as set forth in claim 1, wherein the pRB 31 is a mixture of hydroxyl and vinyl forms.

7. A black ink composition as set forth in claim 1, wherein the dyes are present in a ratio of from about 1:10 to about 10:1.

8. A black ink composition as set forth in claim 1, wherein the dyes are present in a ratio of about 1:4 to 4:1.

9. A black ink composition as set forth in claim 1, wherein the dyes are cumulatively present in an amount of from about 1 to about 10 percent by weight of the ink composition.

10. A black ink composition as set forth in claim 1, wherein the dyes are cumulatively present in an amount of from about 3.5 to about 4.5 percent by weight of the ink composition.

11. An inkjet image consisting essentially of:
    a print medium; and
    a mixture of pacified reactive black (pRB) 31 and direct black (DB) 168 dyes, in an inkjet ink vehicle on the print medium,
    said image on said print medium having a gray scale of from 0% to 100% area fill without a visually perceptible change in either a blue, yellow, red, or green color hue.

12. The image of claim 11, wherein the salt form of the dyes are present in a salt form selected from the group consisting of:
    sodium salts, lithium salts, TMA salts, potassium salts, and mixtures thereof.

13. The image of claim 11, wherein the pRB 31 is a hydroxyl form.

14. The image of claim 11, wherein the pRB 31 is a vinyl form.

15. The image of claim 11, wherein the pRB 31 is a mixture of hydroxyl and vinyl forms.

16. The image of claim 11, wherein the dyes are present in a ratio of from about 1:10 to about 10:1.

17. The image of claim 11, wherein the dyes are present in a ratio of about 1:4 to 4:1.

18. The image of claim 11, wherein the dyes are cumulatively present in an amount of from about 1 to about 10 percent by weight of the ink composition.

19. The image of claim 11, wherein the dyes are cumulatively present in an amount of from about 3.5 to about 4.5 percent by weight of the ink composition.

20. A method of eliminating a visually perceptible change in either a blue, yellow, red, or green color hue in an inkjet image consisting essentially of the steps of:

combining a pacified reactive black 31 dye with a direct black 168 dye in an inkjet ink vehicle to form an inkjet ink; and applying the inkjet ink to print medium to form an ink jet image having a gray scale of from about 0% to about 100% area fill.

\* \* \* \* \*